Patented Sept. 27, 1949

2,482,938

UNITED STATES PATENT OFFICE 2,482,938

SOLVENT EXTRACTION OF PENICILLIN

Derrick Rowley, London, Herbert Steiner, Eccles, and Emanuel Zimkin, Sale, England, assignors to Petrocarbon Limited, London, England No Drawing. Application May 16, 1946, Serial No. 670,316. In Great Britain September 26, 1945

3 Claims. (Cl. 260—302)

This invention relates to the solvent extraction of penicillin from aqueous solution and in particular to its extraction from fermented broth, though it is not limited thereto but comprises extraction from any other aqueous medium.

By the term penicillin, we denote the group of anti-bacterial agents which, as Fleming has shown, are produced by certain moulds probably by "*Penicillium notatum*" (see British Journal of Experimental Pathology, 1929, vol. 10, p. 226).

In the usual method of producing penicillin the latter is recovered from fermented solutions by extraction with solvents. This solvent extraction fulfils two purposes. It concentrates the penicillin into a smaller amount of solvent and thus reduces the volume which has to be evaporated finally for the recovery of the solid penicillin concentrate, and secondly selective solvents extract penicillin in preference to its accompanying impurities and thus allow one to recover a much purer product.

There are, however, a number of features associated with that process which render difficult a quantitative recovery and the production of a penicillin of high purity.

The object of the present invention is to provide an improved method for the solvent extraction of penicillin from aqueous media.

The extraction of penicillin is based on the fact that penicillin is a weak acid which, in aqueous solutions of increasing acidity (pH less than 4) becomes less and less dissociated and thus more soluble in organic solvents. From solutions of pH not less than 6, on the other hand, it is easy to extract the penicillin from organic solvents into the aqueous phase.

This procedure of extracting into solvents and re-extracting from solvents is usually carried out twice, although to obtain a pure product the procedure can be repeated more frequently. More than one solvent may be used, that is to say, if for instance amylacetate is used in the first extraction chloroform is frequently used in the second extraction, and further solvents may be used in further stages. In any case there results finally a dilute solution of the sodium or calcium salt of penicillin, depending on whether sodium hydroxide or calcium hydroxide is used in the final neutralising extraction. This solution still contains a considerable amount of impurities, thus the solid obtained from it by evaporation in vacuo is by no means the pure salt of penicillin. The evaporation is done in practice usually by the method of "freeze drying" and there results a product of a purity of about 300—900 Oxford units per milligram (Lancet, 1941, ii, 177) which assuming that pure penicillin on an average corresponds to about 1600 O. U./mg. is equivalent to a purity of from 20 to 60 per cent.

The yield of penicillin is about 50–80% of the penicillin initially present in the broth.

While at the higher limit these results seem reasonably satisfactory at the lower limit recoveries and purity are poor. Yet even with solvents which, according to their distribution characteristics, should give results near or even better than the best of those mentioned above, it is by no means possible to obtain them continuously. The reason for this is the lability of the penicillin particularly in acidic solution. To illustrate this point it has ben found that in a solution of penicillin contaminated with the usual impurities kept at 10° C. and at a pH of 2 half the penicillin present initially is inactivated within a period of about 20 minutes while at a pH of 3 the penicillin is already much more stable, 120 minutes being required to reduce its potency to one half of its original value. In order to carry out the extraction in an efficient and economic way it is necessary to extract it from the aqueous solution at a pH of about 2, since at values of pH greater than 2 the extraction coefficients of the usual solvents such as amylacetate or methyl-isobutylketone are too unfavourable. In order to avoid destruction of penicillin it has heretofore been necessary to employ such types of apparatus as extract efficiently within a very short time of contact. This apparatus, however, is expensive and difficult to construct. Even with such apparatus trivial incidents such as partial stopping of tubes or passages may occur which involve unduly long contact of the penicillin and under pH conditions which are deleterious to the penicillin. It is therefore not surprising that under those conditions, even with the best equipment, quite frequently large losses of penicillin occur due to inactivation.

We have found that these conditions of having to work at a dangerous pH can be avoided by using certain types of solvents which have a considerably improved solvent power as compared with the best solvents used hitherto. This improved solvent power allows one to work at a pH greater than 2 and thereby give a larger margin of safety and thus avoid the difficulties mentioned above. It is quite easy to work at a pH of 4 and if several extraction stages are used it is possible to work at a pH of 5 and even approaching 6. The solvents have the further advantage of allowing an increased reduction in volume of the solution containing penicillin and they possess good selectivity, which allows one to recover a penicillin of considerable purity.

Apart from great solvent power an efficient solvent must be selective for penicillin, that is, it must dissolve penicillin in preference to the impurities accompanying it. Of these impurities various organic acids are the most difficult to remove. The solvents of the present invention exhibit selective properties which in general are better than those possessed, for instance, by amylacetate, although not necessarily as specific as chloroform. Chloroform however has the drawback of a low solvent power particularly at a pH of 2.5 consequently if it is used one has to extract at low pH with the attending dangers of inactivation.

The invention consists in a process for solvent extraction of penicillin wherein the solvent or solvents, which may be single or mixed solvents, employed belong to the class consisting of the methylcyclohexanones, i. e. monomethyl and dimethylcyclohexanones.

(1) The process is applied to the extraction of penicillin from fermented broth;

(2) The process is applied to the purification of penicillin by repeated extraction and re-extraction;

(3) The process may employ solvents which are themselves mixtures of isomers such as methylcyclohexanone and dimethylcyclohexanone.

The invention also consists in processes for the solvent extraction of penicillin carried out substantially in accordance with any of the several examples given below.

The following examples illustrate how the invention may be carried into effect.

*Example 1*

The material to be extracted comprised 200 c. c. of a solution of penicillin containing a total of 1,000,000 O. U. or 5,000 O. U./c. c. The amount of solid material in this solution was 6,800 mg. or 34 mg./c. c. Thus assuming complete recovery the equivalent potency of the solid material recoverable from this solution is 150 O. U./mg. This solution was mixed at 0° C. with 20.6 c. c. of aqueous solution containing 10% by weight of orthophosphoric acid, which brought the acidity of the penicillin solution to a pH of 4. The resulting acidified solution was then extracted with 200 c. c. methyl-cyclohexanone. After separation an amount of penicillin equivalent to 950,000 O. U. was found in the methyl-cyclohexanone layer and an amount equivalent to 59,000 O. U. in the aqueous layer. The amount of solids extracted by the solvent was 1,400 mg., thus the potency of the solid material obtained from the solvent was equivalent to 680 O. U./mg.

*Example 2*

20 c. c. of a solution of penicillin containing an amount equivalent to 18,800 O. U. were acidified at 0° C. with 0.90 c. c. of an aqueous solution containing 10% orthophosphoric acid, thus imparting to the penicillin solution a pH of 3.9.

This solution was then extracted at 0° C. with 20 c. c. of technical dimethylcyclohexanone, prepared from xylenols from coal tar. After separation of the two layers an amount of penicillin equivalent to 18,000 O. U. or about 95% of that originally present was found in the organic layer, while an amount equivalent to 900 O. U. was found in the aqueous layer.

*General*

Although in carrying the present invention into effect it is not necessary to employ the types of apparatus previously used for the extraction of penicillin one may if desired utilise such usual procedure employing pumps or line mixers as mixing equipment and high speed centrifuges to separate the solvent from the aqueous phase. This procedure has the advantage of a short contact of solvent and aqueous layer due to the rapid separation in the centrifuge, thus minimising the losses due to inactivation of the penicillin. On the other hand this equipment is expensive and its handling and maintenance require care. With solvents in accordance with the present invention it is possible to work under conditions of acidity where pH is greater than 4 where penicillin is comparatively stable, consequently in the extraction equipment centrifuges can be replaced by settling tanks, which require a longer separation time but are very much less expensive.

Substantially all the solvents mentioned above are referred to in literature, but where this is not the fact they can readily be synthesized by conventional methods.

We claim:

1. In the process of recovering penicillin from aqueous liquors containing the same, the steps which comprise bringing such an aqueous liquor to a pH of about 2 to 6, admixing therewith at least one methyl cyclohexanone, separating the resulting organic solvent layer from the aqueous layer and recovering penicillin from the former.

2. The process of claim 1 wherein the methyl cyclohexanone is mono-methyl cyclohexanone.

3. The process of claim 1 wherein the methyl cyclohexanone is dimethyl cyclohexanone.

DERRICK ROWLEY,
HERBERT STEINER.
EMANUEL ZIMKIN.

REFERENCES CITED

The following references are of record in the file of this patent:

Lancet, II, Aug. 16, 1941, pp. 177–189.

Abraham: British J. of Experimental Pathology, vol 23, June 1942, No. 3, pp. 103–115.